No. 758,407. PATENTED APR. 26, 1904.
J. H. BELSER.
BENCH DOG.
APPLICATION FILED JAN. 21, 1904.
NO MODEL.

Witnesses
Chas. K. Davies.
Phils Burritt

Inventor
James H. Belser
by F. B. Brock
Attorney.

No. 758,407. Patented April 26, 1904.

UNITED STATES PATENT OFFICE.

JAMES H. BELSER, OF MARLBORO, MASSACHUSETTS.

BENCH-DOG.

SPECIFICATION forming part of Letters Patent No. 758,407, dated April 26, 1904.

Application filed January 21, 1904. Serial No. 189,993. (No model.)

*To all whom it may concern:*

Be it known that I, JAMES H. BELSER, of Marlboro, county of Middlesex, and State of Massachusetts, have invented certain new and useful Improvements in Bench-Dogs; and I do hereby declare the following to be a full and clear description thereof.

My invention relates to bench-dogs or bench-sets.

Figure 1:
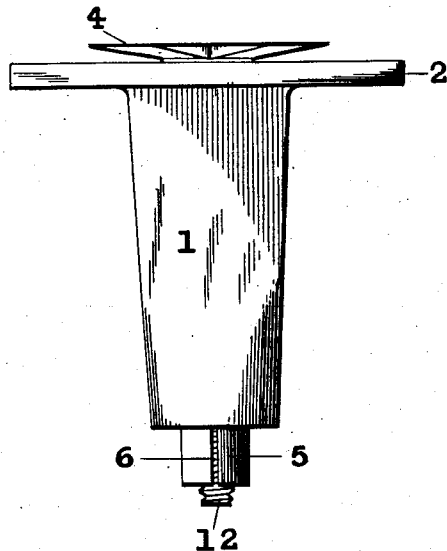
Figure 2:
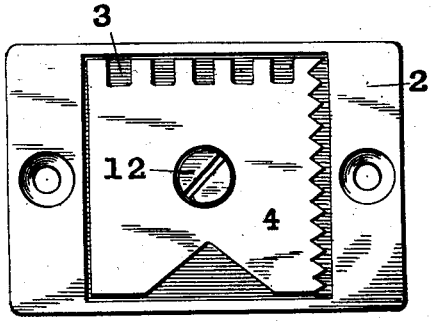
Figure 4:
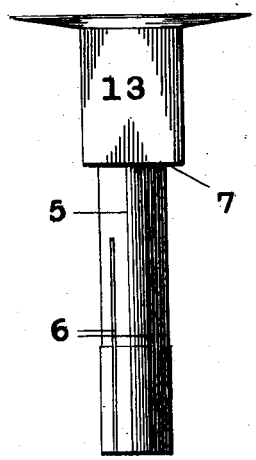
Figure 3:
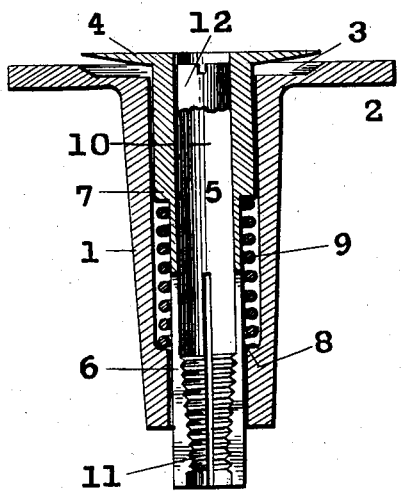
Figure 5:
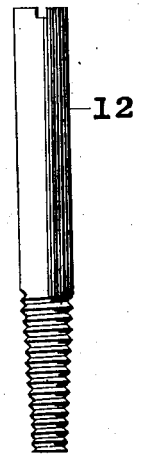

Figure 1 represents a side view of the device to which my improvement has been attached. Fig. 2 is a plan view. Fig. 3 is a longitudinal vertical section. Fig. 4 is a side elevation of the dog and its shank, and Fig. 5 is a view of the tapering adjusting-bolt.

The invention consists in the following construction and combination of parts, the details of which will first be described and the features of novelty then set forth in the claims.

The device comprises the usual outer casing 1, provided with the upper flange 2, both of which are generally adapted to be mortised into a workman's bench. The upper flange 2 has a depressed recess 3, within which the dog or set 4 proper is adapted to be received. The dog 4 is provided with a shank 5, which is longitudinally and radially slotted at 6 for the purpose of forming an expanding section adapted to bite against the inner shell of the casing 1. This shank is provided with a collar projection 7 and the casing with a similar collar projection 8, between which, surrounding the shank, is located a coiled spring 9. The interior of the shank 5, carrying the dog 4, is provided with a longitudinal central opening 10, the lower end 11 of which is taper-choked and threaded. Within this central opening takes the adjusting and locking bolt 12, the lower end of the bolt being provided with a tapering thread extending to the choked portion of the shank 5. By loosening the bolt 12, which is preferably provided with a screw-head, the bolt is withdrawn from the choked portion of the shank and the spring 9 acts to throw the dog 4 upwardly. The dog may be adjustably set at any vertical height by simply depressing the same and screwing the bolt 12 until it forces the slotted end of the shank 5 outwardly, extending it against the inner shell of the casing 1, thereby securely locking the dog in position.

Of course the device may be made in any proportion to give any varied adjustment. In Fig. 2 the dog is shown provided with four different clamping-faces adapted for different kinds of work.

Upon loosening the bolt 12 the spring throws the dog upwardly, when the square portion of the shank 13 may be lifted out of the casing and rotated so as to bring any one of the four faces of the dog 4 into operative position.

This bench-dog is a marked improvement over those heretofore used. The locking-adjustment is positive and will not become loose under successive vibrations to which this class of tool is subjected. Many of the bench-dogs now in use are open to this objection.

I claim—

1. In a bench-dog the combination of a casing provided with a flange having a recess, a hollow shank provided with a dog at its upper end and at its lower end with a series of radial slots and a taper-choked bore, a bolt within the bore of the shank having a corresponding taper for extending the radial sections of the shank, and a spring interposed between the shank and the casing.

2. In a bench-dog the combination of a casing having an angular recess, a hollow shank movable therein having a portion thereof angularly shaped in cross-section and a dog at the top thereof having a series of engaging faces and a locking-bolt within the shank and concentric therewith, the shank adapted to be rotated in the casing.

3. In a bench-dog the combination of a casing, a hollow shank adapted to rotate therein having multiple-faced engaging faces, said shank adapted to be rotated to present any one of the faces toward the work and a locking-bolt within the shank and concentric therewith.

In testimony whereof I have affixed my signature in the presence of two witnesses.

JAMES H. BELSER.

Witnesses:
 EDGAR WEEKS,
 BLANCHE POITRAS.